W. J. NELSON.
APPARATUS FOR MIXING MOLDING SAND.
APPLICATION FILED JAN. 23, 1917.
1,224,659.
Patented May 1, 1917.
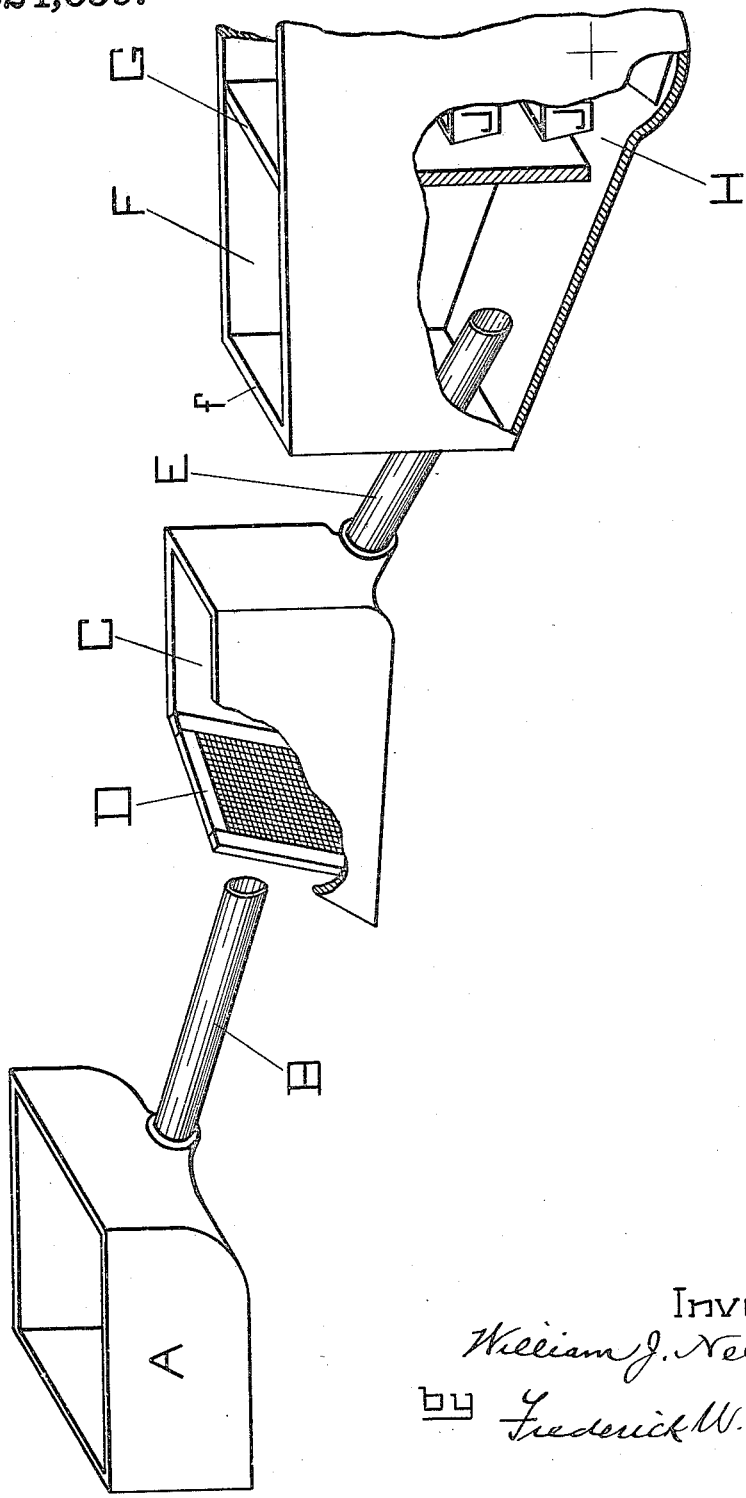
Inventor.
William J. Nelson,
by Frederick W. Cameron.
Atty.

UNITED STATES PATENT OFFICE.

WILLIAM J. NELSON, OF WEST ALBANY, NEW YORK, ASSIGNOR TO WEST ALBANY MOULDING SAND CO., OF WEST ALBANY, NEW YORK, A CORPORATION.

APPARATUS FOR MIXING MOLDING-SAND.

1,224,659. Specification of Letters Patent. Patented May 1, 1917.

Application filed January 23, 1917. Serial No. 144,029.

*To all whom it may concern:*

Be it known that I, WILLIAM J. NELSON, a citizen of the United States of America, residing at West Albany, in the town of Colonie, in the county of Albany and State of New York, have invented certain new and useful Improvements in Apparatus for Mixing Molding-Sand, of which the following is a specification.

My invention relates to apparatus for mixing molding sand, and the object of my invention is to provide a means for mixing the sand and loam in proper condition for successful use in the art of molding; together with such other elements and combinations as are hereinafter more particularly set forth.

I accomplish these objects as illustrated in the accompanying drawing, in which:

The figure is a perspective view, with parts broken away, of my apparatus.

Heretofore, so far as I am informed, molding sand has been mixed only after it has been dried. The passing of the sand over radiators for drying it is an expensive and slow operation. I have devised a means whereby the sand and loam may be mixed quickly under water and the mixture removed as desired. I do not limit myself to the particular size or construction of my apparatus, which consists of means for mixing sand and loam with water, screening the mixture and delivering it into a receptacle, causing it to flow therein against an obstruction whereby it will pile up and the flowing water and sand will impinge against the obstructed sand and loam. A restricted opening beneath the obstruction, and therefore beneath the surface of the piled-up mass, will permit of the thoroughly mixed viscid substance escaping to a space beyond the obstruction from whence it may be removed as desired.

Referring to the drawing:

I first place sand, loam and water into a suitable box, A, from which they will flow by gravity through a pipe, B, into a grille, C, the meshes of the sieve, D, screening out those particles too large to pass through the sieve and from the grille the water, sand and loam will flow by gravity through one or more pipes, E, into a mixing box, F, which preferably has its bottom at an angle to the horizontal, so that the water, sand and loam entering the mixing box will flow toward one end of the box with some speed. I place an obstruction, G, extending across the box, but slightly raised above the bottom of the box so that the sand will pile up against the obstruction, although some of it will constantly pass through under it into the portion, H, of the box, where it may be taken up by the buckets, J, J, to a suitable storing device, not shown. The water from the box, F, will back up from the obstruction and spill over the end, *f*, of the box. The action of the water and sand striking against the obstruction, G, and piling up there will tend to mix the sand and loam therein to such a degree that when it passes out under the obstruction it will be in a suitable condition for use for molding purposes.

What I claim as my invention and desire to secure by Letters Patent is:

1. An apparatus for mixing molding sand, comprising a receptacle for the sand, loam and water; means connected with the lower portion of the said receptacle whereby the solution from the receptacle may flow by gravity; a grille into which the solution from the receptacle flows and is strained; pipes leading from the grille to a mixing device through which the solution after passing through the grille will flow by gravity; a mixing box into which said solution is delivered; a floor in said mixing box placed at an angle to the horizontal; and an obstruction in said mixing box, with a restricted opening at the bottom thereof through which the mixture of sand and loam and a small quantity of water will be excluded from the bottom of the mixing chamber.

2. An apparatus for mixing molding sand, comprising a receptacle for the sand, loam and water; means connected with the lower portion of the said receptacle whereby the solution from the receptacle may flow by gravity; a mixing box into which said solution is delivered; a floor in said mixing box placed at an angle to the horizontal; and an obstruction in said mixing box, with a restricted opening at the bottom thereof through which the mineral contents of the solution after being thoroughly mixed will be excluded from the bottom of the mixing chamber.

In testimony whereof I have affixed my signature in the presence of two witnesses.

WILLIAM J. NELSON.

Witnesses:
D. B. WADE,
BEULAH CARLE.

Copies of this patent may be obtained for five cents each, by addressing the "Commissioner of Patents, Washington, D. C."